(12) United States Patent
Schultz

(10) Patent No.: US 6,429,714 B1
(45) Date of Patent: Aug. 6, 2002

(54) PROCESS, VOLTAGE AND TEMPERATURE INDEPENDENT CLOCK TREE DESKEW CIRCUITRY-TEMPORARY DRIVER METHOD

(75) Inventor: Richard T. Schultz, Fort Collins, CO (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 10/109,974

(22) Filed: Mar. 29, 2002

Related U.S. Application Data (63) Continuation-in-part of application No. 09/915,237, filed on Jul. 25, 2001, which is a continuation-in-part of application No. 09/596,677, filed on Jun. 19, 2000, now Pat. No. 6,340,905.

(51) Int. Cl.[7] .................................................. H03K 3/00
(52) U.S. Cl. ...................................... 327/291; 327/161
(58) Field of Search ................................ 327/291, 292, 327/293, 294, 295, 565, 161, 162, 163, 158; 326/101

(56) References Cited

U.S. PATENT DOCUMENTS

| | | | |
|---|---|---|---|
| 5,414,381 A | | 5/1995 | Nelson et al. ............... 327/262 |
| 5,420,544 A | * | 5/1995 | Ishibashi ...................... 326/93 |
| 5,467,040 A | | 11/1995 | Nelson et al. ............... 327/276 |
| 5,656,963 A | * | 8/1997 | Masleid et al. ............. 257/208 |
| 5,668,490 A | * | 9/1997 | Mitra et al. ................. 327/203 |
| 5,923,188 A | | 7/1999 | Kametani et al. ............. 326/93 |
| 6,011,441 A | * | 1/2000 | Ghoshal ...................... 327/144 |
| 6,081,148 A | | 6/2000 | Song ........................... 327/292 |
| 6,111,436 A | | 8/2000 | Molnar ......................... 327/19 |
| 6,204,713 B1 | | 3/2001 | Adams et al. ............... 327/295 |
| 6,275,555 B1 | | 8/2001 | Song ........................... 375/375 |
| 6,323,714 B1 | * | 11/2001 | Naffziger et al. ........... 327/149 |
| 6,340,905 B1 | * | 1/2002 | Schultz ........................ 327/161 |

\* cited by examiner

*Primary Examiner*—Timothy P. Callahan
*Assistant Examiner*—Linh Nguyen
(74) *Attorney, Agent, or Firm*—Suiter & Associates PC (57) ABSTRACT

A multilevel clock tree uses a temporary clock buffer or reference signal in a clock tree deskew circuit to dynamically minimize skew in a variable delay clock signal that synchronizes operation of synchronized circuit components of an integrated circuit. There are multiple temporary clock buffer signals at each level of the multilevel clock tree. Skew between the temporary clock buffer signals are minimized by providing identical path lengths and path geometries at each level of the temporary clock buffer. The clock tree deskew circuit reduces the clock tree skew, on a level by level basis, in repeated intervals over a period of time. When each level of the tree deskew circuit is deskewed, that level of the clock tree deskew circuit is then turned off to prevent unnecessary further adjustments to the clock signals, but can be turned back on when conditions change that alter the clock tree skew. The clock tree deskew circuit adjusts the variable delay clock buffer signal of each pair toward the temporary clock buffer signal of the pair to reduce the skew between the two clock buffer signals. After a predetermined number of adjustment cycles, the overall clock skew of the variable delay clock buffer signal is minimized by repeated adjustments. The variable delay clock buffer signals of each level may be optionally set as conditions warrant.

26 Claims, 7 Drawing Sheets

Resulting Clock Tree Rise and Fall Time Wave Forms

PROCESS, VOLTAGE AND TEMPERATURE INDEPENDENT CLOCK TREE DESKEW CIRCUITRY-TEMPORARY DRIVER METHOD

CROSS REFERENCE TO RELATED APPLICATIONS

This application is a continuation-in-part of U.S. patent application Ser. No. 09/915,237, filed Jul. 25, 2001, which is a continuation-in-part of U.S. patent application Ser. No. 09/596,677, filed Jun. 19, 2000, now U.S. Pat. No. 6,340,905 B1. U.S. patent application Ser. Nos. 09/915,237 and 09/596,677 are herein incorporated by reference.

FIELD OF THE INVENTION

This invention relates to clock signal fan out within integrated circuit (IC) chips and, specifically, to a method of deskewing clock signals at various levels of a multilevel clock tree.

BACKGROUND OF THE INVENTION

Conventional integrated circuits (ICs) use a clock signal and branch it out through a series of buffers to form a plurality of clock signals. The structure of the branching of the clock signal is called a "clock tree." One or more clock trees can be present in a single IC. For example, a clock signal at a given branch, or level, of the clock tree may feed into three buffers to produce three clock signals at the next level, which may each feed into three more buffers to produce nine clock signals at the third level. The clock signals at any level of the clock tree are sent to various synchronous components of the IC to coordinate the functions of these components. For various reasons, however, any two clock signals, even at the same level of the same clock tree, may be slightly different or offset from each other. This difference in clock signals is called "clock skew," and differences throughout several clock signals of any level of the clock tree is called "clock tree skew".

Clock tree skew has several causes. For example, the buffers between levels in the clock tree typically introduce a delay between their input and output clock signals, so clock signals at different levels of the clock tree are usually naturally skewed from each other. Additionally, the load experienced by one clock signal may introduce a delay into the clock signal different from that of another load on another clock signal. Furthermore, changes in temperature, different applied voltages and differing semiconductor fabrication processes can affect the clock skew. Such other causes of clock skew are typically due to temperature variations, circuit load variations, different applied voltages, different semiconductor fabrication processes and inadequate tolerances in the semiconductor fabrication process.

One prior art device employs a power PC chip which has buffers with multiple trees to drive a large bus. Performance is less than optimal because changes in the rise and fall times of these many drivers slows system operation.

Another prior art device relied on a neighboring clock signal for deskewing in which each finally derived clock signal drove the active components of the integrated circuit. This device consumed a notable area of semiconductor substrate and was somewhat susceptible to process, voltage, and temperature variations.

There is a need to provide a method to reliably generate multiple levels of well calibrated clock signals which requires minimal semiconductor substrate area and has reduced susceptibility to process, voltage, and temperature variations.

SUMMARY OF THE INVENTION

The present invention enables dynamic self-detection and correction of clock tree skew in an integrated circuit (IC) using a multilevel clock tree. Each level has a temporary clock buffer or reference signal which is used to deskew the variable delay clock buffer signals. Several temporary clock buffer signals are generated at each level. By designing their signal paths to be the same length and geometry, the temporary clock buffer signals of a given level are synchronized. Only the variable delay clock buffer signals proceed to the next level of the multilevel clock tree.

Clock skew variations due to temperature changes, different applied voltages and different semiconductor fabrication processes are corrected at each level of the multilevel clock tree. Thus, as clock skew increases or decreases during operation of the IC, the present invention may dynamically detect and correct the changing clock skew on-the-fly. In this manner, the adjustment of each clock signal in a clock tree does not rely on a single determination and adjustment of the anticipated clock skew during the design of the IC, but is altered and re-altered as is dynamically determined to be appropriate by a skew detection and adjustment circuitry, particularly in response to differences in applied voltage, temperature and fabrication process. The design combines signal path length balancing with temporary clock buffers for calibration. The clock skew of every variable delay clock buffer signal of each level may be independently set as circumstances warrant.

In the skew detection and adjustment circuitry of the present invention, each variable delay clock buffer signal in a clock tree is paired with a temporary clock buffer signal at each level in the clock tree. The absolute skew between the two clock signals in each pair is detected, and the variable delay clock buffer signal of each pair is adjusted forward or backward as appropriate. Such adjustment of the clock signals is performed by adding or subtracting a certain amount of delay. The detection and adjustment is repeated in increments as necessary to reach an acceptable minimum skew. Thus, the invention has the advantage of automatically correcting for almost any amount of clock skew. Additionally, since the skew detection and adjustment circuitry may dynamically detect and correct absolute skew between a pair consisting of a temporary clock buffer signal and a variable clock delay buffer signal, the invention has the further advantage of automatically correcting for clock skew variations due to different applied voltages and/or different semiconductor fabrication processes that could not be anticipated during the design of the IC. The detection and adjustment may be performed during the operation of the IC to account for changing clock skew patterns or it may be performed as needed.

The clock tree deskew circuit preferably includes a plurality of skew adjust circuits and a corresponding plurality of skew detect circuits. The clock tree deskew circuit of a level also preferably sends output clock signals to either the synchronized circuit components or to the next level of the clock tree. Each skew adjust circuit corresponds to and produces one of the variable delay clock buffer signals. The skew detect circuits connect to their corresponding skew adjust circuits to receive the corresponding variable delay clock buffer signal. Each skew detect circuit also receives a temporary clock buffer signal. Each skew detect circuit produces an adjustment signal to its corresponding skew adjust circuit indicative of whether the variable delay clock signal preceded the temporary buffer signal. Each skew adjust circuit preferably receives the adjustment signal and shifts the corresponding variable delay clock buffer signal accordingly.

The multilevel clock tree of the present invention may be arranged such that each level is concentric to the others. This arrangement helps provide symmetry for the temporary clock buffer signal paths to ensure synchronization of the temporary clock buffer signals through the matching of signal path geometry and path length. The present invention provides an improvement over current methods in being able to adjust clock skew over temperature, process, and voltage variations and on the fly within just a few clock cycles.

In a portable device which incorporates an integrated circuit which has a multilevel clock tree of the present invention, a user may be able to selectively synchronize the timing of an integrated circuit having the multilevel clock tree. This would allow the user to synchronize the timing when he suddenly goes out doors or experiences a change of environment or climate.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous objects and advantages of the present invention may be better understood by those skilled in the art by reference to the accompanying figures in which.

DETAILED DESCRIPTION OF THE INVENTION

Reference will now be made in detail to an embodiment of the invention, examples of which are illustrated in the accompanying drawings.

Figure 1:
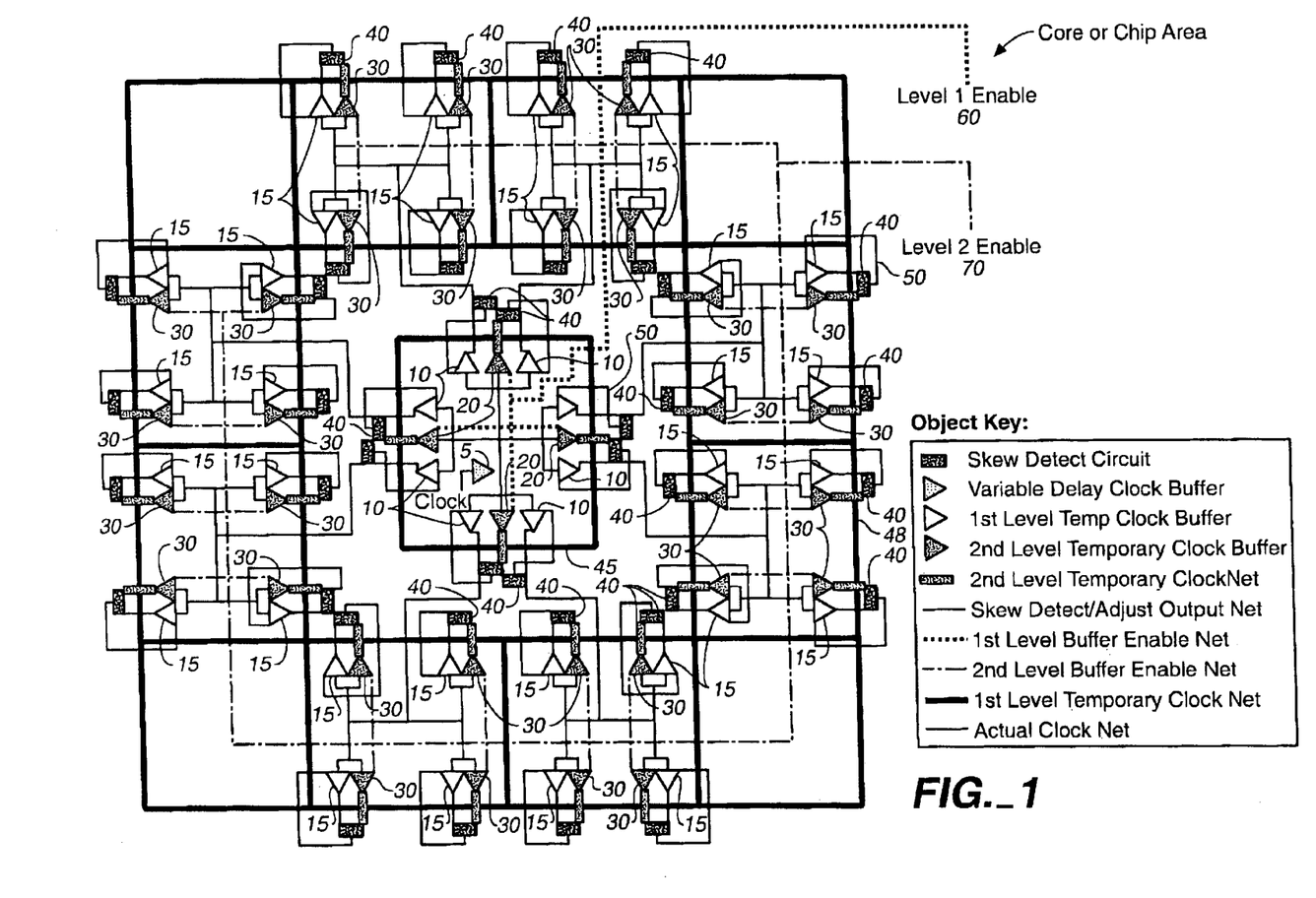
FIG. 1 is a physical layout of a two level clock tree of the present invention.

In FIG. 1, in an exemplary embodiment, there are two levels to the clock tree. FIG. 1 is merely illustrative as the present invention is not limited to two levels, but may be practiced with three, four, or more levels. It may also be practiced with but a single level. The circuit operates based on two temporary clock nets each turned on or off independently. The first level temporary clock net 45 is turned on (by the level 1 enable net 60) and driven by four first level temporary clock buffers 20. There may be a greater or lesser number of first level temporary clock buffers 20. There may be two, three, eight, etc. temporary clock buffers in the first level. A natural limit on the maximum number of temporary clock buffers is the fan out capability of the immediate source of the input clock signal. The fanout may be limited to four, six, eight, or another number. The second temporary clock tree net 48 is turned off or grounded by the level 2 enable net 70. The first level temporary clock buffers 20 are driven by one starting buffer 5 shown connected to the "clock" in the center of the chip. This source clock which provides an input to buffer 5 may be provided by an off chip voltage controlled oscillator, a crystal oscillator, or the like, proximately disposed to the integrated circuit.

Since the delay along the four nets connected to the initial "clock" buffer may not be identical due to intra die interconnect process variations and due to different neighboring routes, the first level temporary clock buffers 20 may not all turn on at the same time. Additional differences in turn on times may be caused by intra die transistor variation, variations in signal line lengths, and differing capacitive effects. However, in the present invention, the input signal paths of each temporary clock buffer of a given level are designed to be the same length in an H style layout of the signal paths. Thus, the clock signal into each temporary clock buffer is presumed to be identical to the clock signal of the other temporary clock buffers of the same level. In other words, the temporary clock buffer signal paths are balanced which results in fewer and minimal adjustments.

In FIG. 1, additional delay programmable delay buffers 10 are provided right next to each of the temporary clock buffers 20. The temporary clock buffer signal is a reference signal used to deskew at least one variable delay clock buffer signal but fewer than all the variable delay clock buffer signals of a given level of the clock tree. The variable delay clock buffer signal is adjusted with respect to this reference signal to provide a portion of the variable delay clock buffer signals and temporary clock buffer signals of the next level or to provide a portion of the clock signals which time the synchronized active components of the integrated circuit.

The temporary clock buffers 20 are connected to the original "clock" buffer 5 in the center of the chip. These programmable clock tree buffers 10 are used to drive the next level of the clock tree. The programmable clock tree buffers 10 receive a variable delay clock buffer signal of a first level and provide either the actual clocks which run the active circuitry in the IC or the variable delay clock buffer signals and temporary buffer signals of the next level. The programmable buffers turn on times may not be identical and may have some skew between them. For this reason, the programmable buffers outputs are also connected to a skew detect or phase detect circuit 40. The skew detect circuit 40 produces a 1 or 0 depending on whether the temporary clock buffers 20 or the first level programmable delay buffer output 10 arrives first. If the programmable delay buffer 10 arrives last, its speed is increased to match the temporary clock net 20. All first level programmable delay buffers 10 are adjusted at the same time. The number of cycles needed and deskew capability depends on the resolution of the programmable delay buffer increments. With the present invention, the final deskew may be kept considerably under 20 to 30 picoseconds and may even be as low as 5 picoseconds.

The first level programmable delays are first established. Testing equipment may be used on a representative sample of IC units to make a firm determination as to the variance of the clock signals generated from the different tree levels. After the first level programmable delays are set, the first level temporary clock buffers are turned off or grounded by the first level enable signal 60. The programmable delay clock buffers 10 are also now held constant in terms of delay and no further adjustments are necessary. They still remain active and are not controlled by the first level enable signal.

The first level programmable delay drivers 10 next to the temporary buffers 20 are now deskewed and drive the second level temporary clock buffers 30 and second level programmable delay buffers 15 next to the temporary clock buffers 30. Now the second level temporary clock buffers 30 are enabled via the level 2 enable net 70. Once again, the net delays, programmable clock buffer delays and temporary clock buffer delays will not be identical. The second level clock net 48 may not have smooth rise and fall times. The temporary 30 and programmable delay 15 buffer outputs are connected to the skew detect or phase detect circuits.

The programmable clock buffers 15 are adjusted to match the temporary clock net 48. The skew detect circuit 40 produces a 1 or 0 depending on whether the temporary net 48 or the second level programmable delay buffer 15 arrives out first. If the programmable delay buffer 15 arrives first, it is then slowed down to match the temporary clock net 48. If the programmable delay buffer 15 arrives last, its speed is increased to match the temporary clock net 48. All second level programmable delay buffers 15 are adjusted at the same time. The number of cycles needed and deskew capability depends on the resolution of the programmable delay buffer increments. The final deskew of the second level programmable clock tree buffers 15 may be set below 20 to 30 picoseconds, even to 5 picosecond or less.

After the second level programmable delays are set, the second level temporary clock buffers 30 are turned off or grounded by the second level enable signal 70. The programmable delay clock buffers are also now held constant in terms of delay and no further adjustments are necessary. They still remain active and are not controlled by the second level enable signal.

This process may be repeated many times depending on how many levels of programmable clock buffers are needed. The resulting skew will not increase with the number of levels added to the design since each level is deskewed prior to the next level being deskewed.

Figure 4:
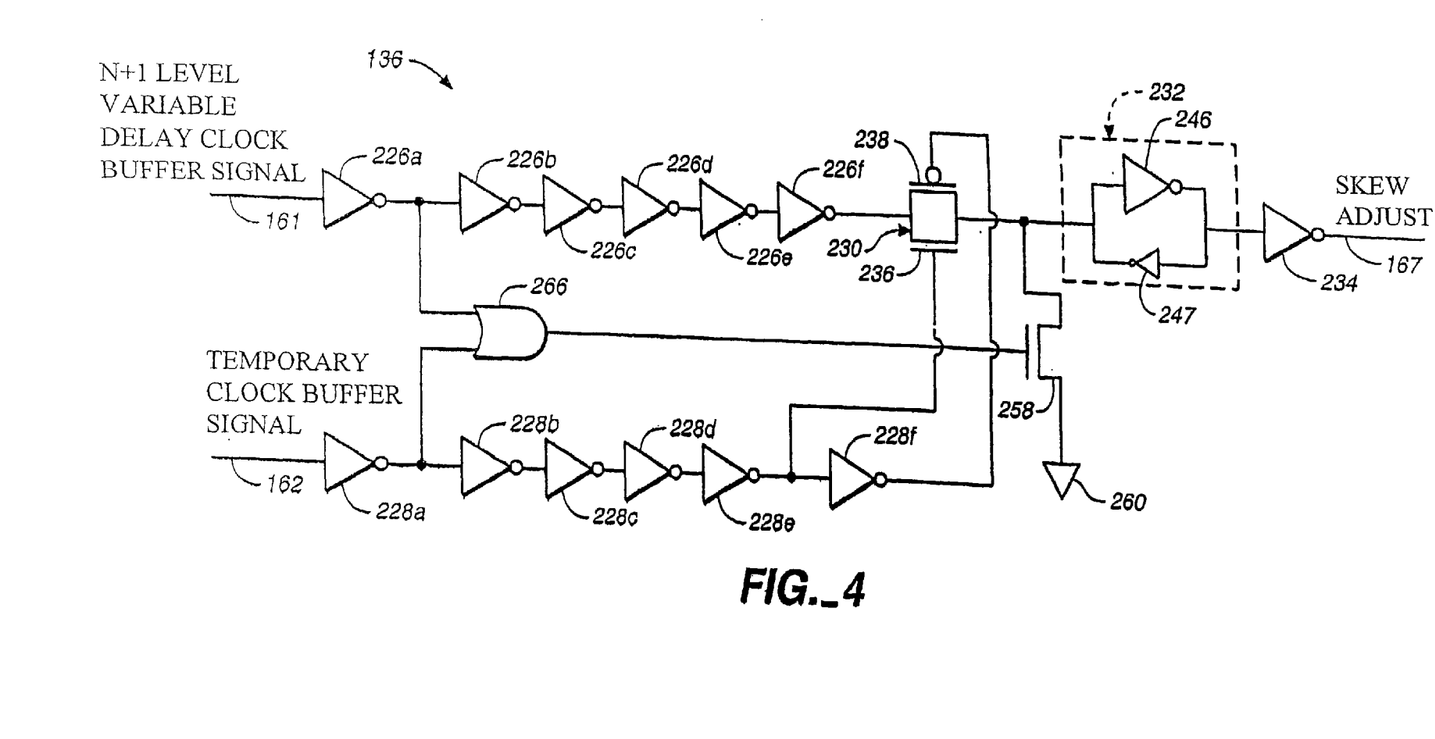
FIG. 4 is a block diagram of a skew detect circuit of the clock tree deskew circuit.

Referring now to FIG. 4, an exemplary skew detect circuit is shown. The skew detect circuit may be conventional or specially designed. It may include two sets of delay buffers, or inverters, 226a–226f and 228a–228f, a pass gate 230, a keeper cell 232 and an output buffer 234. The variable delay clock buffer signal 161 is fed through the delay buffers 226a–226f, and the temporary clock buffer signal 162 is fed through the delay buffers 228a–228f. The skew adjust signal 167 is produced by the output buffer 234. The delay buffers 226a–226f and 228a–228f cause the skew adjust signal 167 to be produced with appropriate timing to be latched by the set/reset flip-flops 185 and 186 (FIG. 2) of the skew adjust circuit. From previous (or, N level) variable delay clock buffer signal 160, N+1 level variable delay clock buffer signal 161 is generated.

The delay buffers 226a–226f are connected to each other in series, with the variable delay clock buffer signal 161 connected to the input of the first delay buffer 226a. The output of the last delay buffer 226f is connected to the pass gate 230. The pass gate 230 also connects to the keeper cell 232 to pass the output signal of the delay buffer 226f to the keeper cell 232 when the pass gate 230 is closed, or turned "on." The pass gate 230 includes a positive-active transistor 236 and a negative-active transistor 238 connected in parallel, such that they are closed when a logic 1 signal activates transistor 236 and a logic 0 signal activates transistor 238. The keeper cell 232 connects to the output buffer 234 to provide the desired value of the skew adjust signal 167 (inverted) to the output buffer 234.

The keeper cell 232 includes two inverters 246 and 247 connected in a loop, such that the input of inverter 246 connects to the output of inverter 247, and the output of inverter 246 connects to the input of inverter 247. The input of the inverter 246 also forms the input of the keeper cell 232, and the output of the inverter 246 also forms the output of the keeper cell 232. In this manner, since the inverter 247 feeds back into the inverter 246, the inverters 246 and 247 maintain the previously received signal as long as no new signal is applied to the keeper cell 232 as described below. The output buffer 234 inverts the output signal of the keeper cell 232 and provides the inverted signal as the skew adjust signal 167 during the time that no new signal is applied to the keeper cell 232. The timing of the skew detect circuit and the skew adjust circuit 148 (FIG. 2) are such that the skew adjust signal 167 is latched by the set/reset flip-flops 185 and 186 (FIG. 2) during this time.

The delay buffers 228a–228f are connected to each other in series, with the temporary clock buffer signal 162 connected to the input of the first delay buffer 228a. Outputs of the second-to-last delay buffer 228e and the last delay buffer 228f are connected to transistors 236 and 238, respectively, of the pass gate 230. Control signals from the delay buffers 228e and 228f control the transistors 236 and 238, respectively, to turn "on" and "off" the pass gate 230 to permit the output signal from the delay buffer 226f to pass through, or not to pass through, the pass gate 230 to the keeper cell 232.

A pull-down transistor 258 is connected between the input of the keeper cell 232 and ground 260. The gate of the pull-down transistor 255 is connected to the output of an OR gate 266. The OR gate 266 receives its inputs from the outputs of the first two delay buffers 226a and 228a. Thus, as long as at least one of the variable delay clock buffer signal 161 and temporary clock buffer signal 162 is a logic 0, then at least one of the input signals to the OR gate 266 will be a logic 1, and the output signal from the OR gate 266 will also be a logic 1. In this case, the pull-down transistor 258 will be turned "on," and the input of the keeper cell 232 will be pulled down to ground, so the output signal from the pass gate 230 cannot be applied to the keeper cell 232 at this time. It is only when both of the variable delay clock buffer signal 161 and temporary clock buffer signal 162 go "low" (i.e. logic 0) that the pull-down transistor 258 is turned "off," and the output signal from the pass gate 230 is applied to the keeper cell 232.

Figure 2:
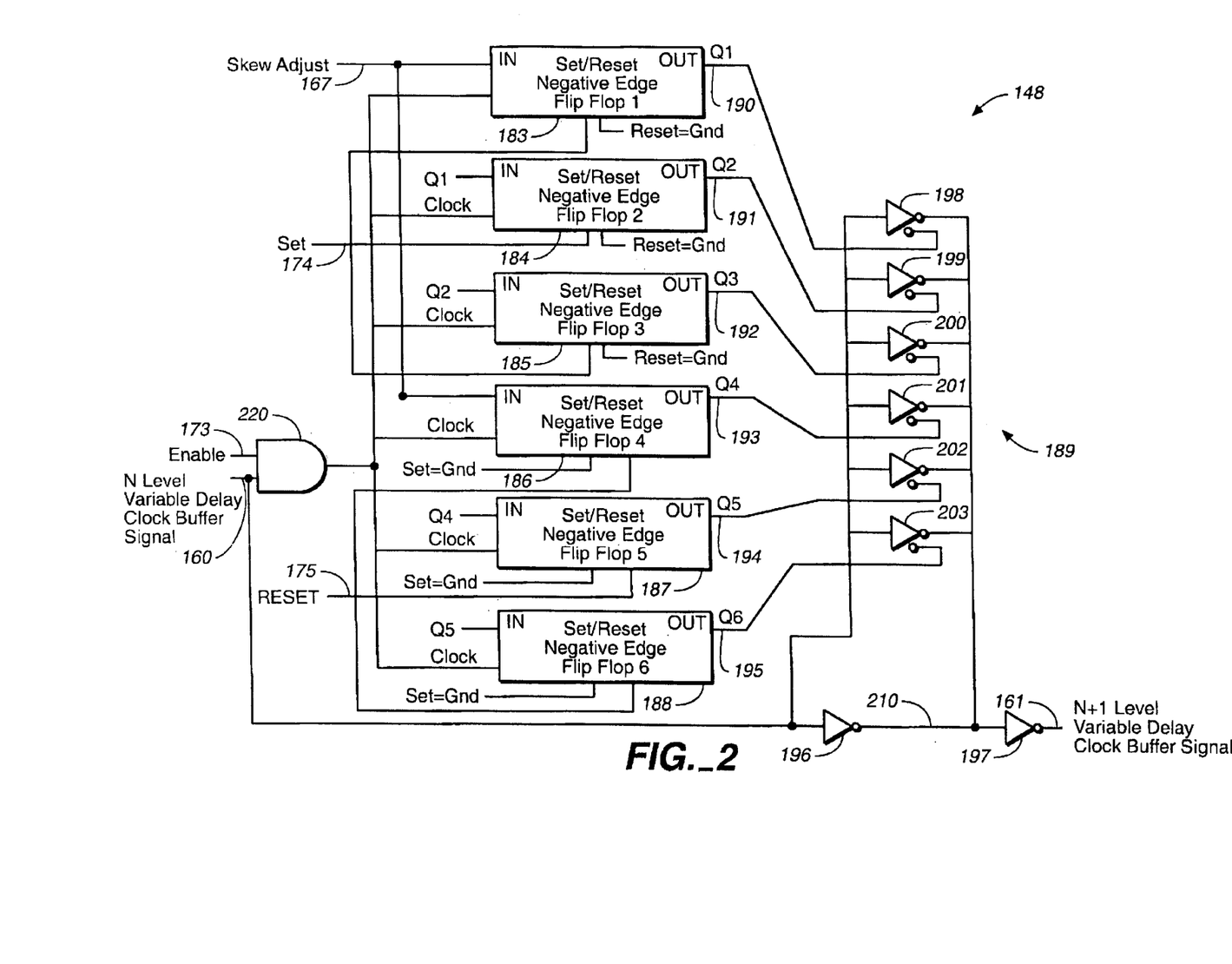
FIG. 2 is an embodiment of a skew adjust circuit of the clock tree deskew circuit.

The output signal from the delay buffer 226f is passed through the pass gate 230 to the keeper cell 232 only when the pass gate 230 is closed, or "on." The pass gate 230 is "on" only when the output signals of the delay buffers 228e and 228f are logic 1 and logic 0, respectively. The output signals of the delay buffers 228e and 228f are logic 1 and logic 0, respectively, only when the temporary clock buffer signal 162 is logic 0, and the logic 0 has propagated through the delay buffers 228a–228f. In other words, the output signal of the delay buffer 226f can pass through the pass gate 230 to the keeper cell 232 only when the temporary clock buffer signal 162 is logic 0. However, the pull-down transistor 258 permits the keeper cell 232 to receive the output signal from the pass gate 230 only when both of the clock signals 161 and 162 are logic 0. Due to the delay of the temporary clock buffer signal 162 through the delay buffers 228a–228f, however, there is a "window of opportunity" for a short time interval after the temporary clock buffer signal 162 transitions from logic 0 to logic 1 for the output signal of the delay buffer 226f to pass through the pass gate 230 before the pass gate 230 is turned "off." The pull-down transistor 258 is turned "off" at the beginning of the "window of opportunity," so that the output signal from the pass gate 230 can be latched by the keeper cell 232. The pulldown transistor 258 remains "off" for an additional period of time during which the keeper cell 232 "holds" the value of the most recent output signal from the pass gate 230. During this period of time, the output buffer 234 supplies the skew adjust signal 167 to the skew adjust circuit 148 (FIG. 2).

If the clock skew between the variable delay clock buffer signal 161 and temporary clock buffer signal 162 is such that the variable delay clock buffer signal 161 precedes the temporary clock buffer signal 162, then the variable delay clock buffer signal 161 will transition from logic 0 to logic 1 before the temporary clock buffer signal 162 does the same. Therefore, since the number of delay buffers 226a–226f is the same as the number of delay buffers 228a–228f, the output signal of delay buffer 226f will become logic 1 for a time approximately equal to the time of the clock skew prior to the turning "off" of the pass gate 230. In this case, the logic 1 value will be latched by the keeper cell 232 and held at this logic value until the pull-down transistor 258 turns on. During this time, the inverter 246 inverts the logic 1 to logic 0, the output buffer 234 inverts the logic 0 to logic 1 for the skew adjust signal 167, and the set/reset flip-flops 183 and 186 (FIG. 2) latch the skew adjust signal 167.

If the clock skew between the variable delay clock buffer signal 161 and temporary clock buffer signal 162 is such that the variable delay clock buffer signal 161 follows the temporary clock buffer signal 162, then the variable delay clock buffer signal 161 will transition from logic 0 to logic 1 after the temporary clock buffer signal 162 does the same. Therefore, the output signal of the delay buffer 226f will still be logic 0 at the time of the turning "off" of the pass gate 230. In this case, the logic 0 value will be latched by the keeper cell 232 and held at this logic value until the pull-down transistor 258 turns "on." between the time that the keeper cell 232 latches the logic 0 and the time that the pull-down transistor 258 turns "on," the inverter 246 inverts the logic 0 to logic 1, the output buffer 234 inverts the logic 1 to logic 0 for the skew adjust signal 167, and the set/reset flip-flops 183 and 186 (FIG. 2) latch the skew adjust signal 167.

Figure 5:
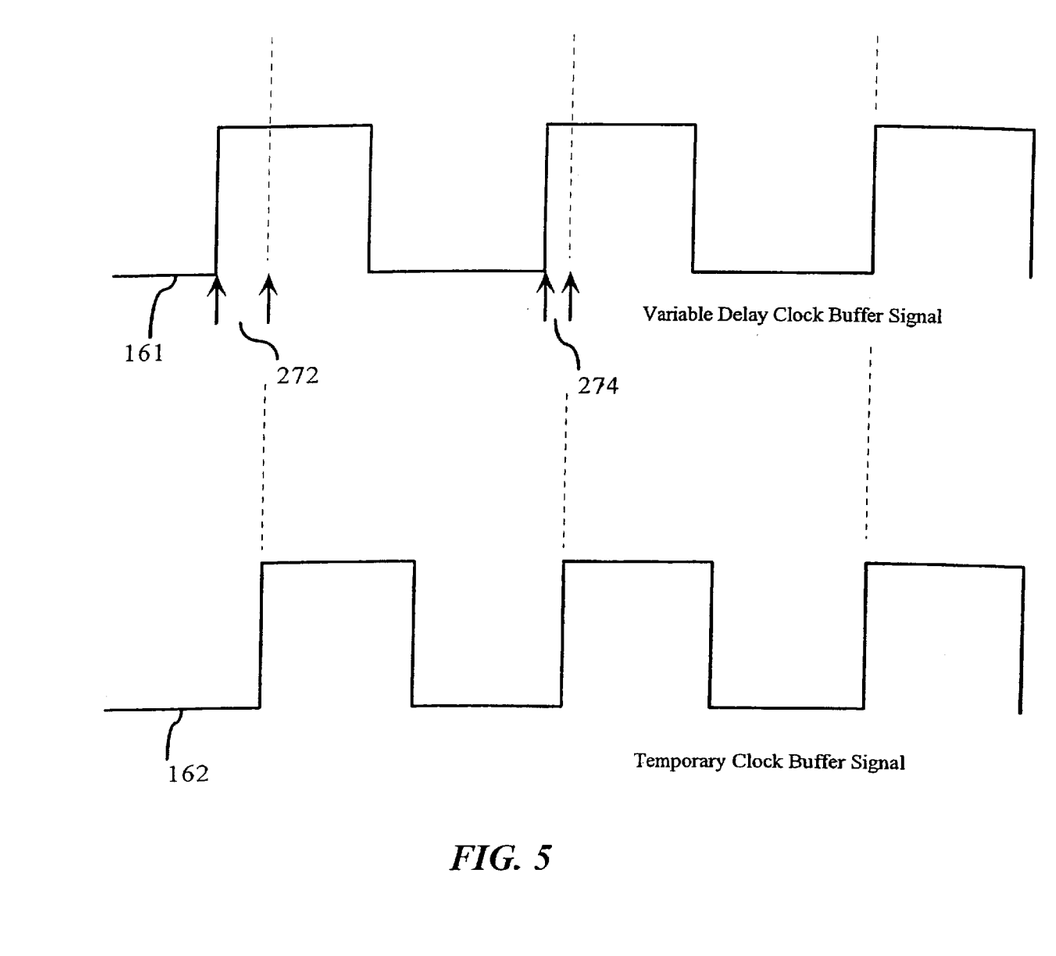
FIG. 5 is a waveform timing diagram illustrating the deskewing of clock signals by the clock tree deskew circuit.

An exemplary clock tree deskew situation with different examples of clock skew between the variable delay clock buffer signal 161 and the temporary clock buffer signal is shown in FIG. 5. In this example, the rising edge of the variable delay clock buffer signal 161 leads the rising edge of the reference signal 162 by a certain amount of time 272. The skew detect circuitry sends an adjustment bit to the skew adjust circuitry. On the next clock cycle, the rising edge of the variable delay clock buffer signal 161 again leads the rising edge of the reference signal 162 by an amount of time 274. The skew detect circuitry sends an adjustment bit to the skew adjust circuitry. The next rising edge of the variable clock delay signal 161 coincides with the next rising edge of the reference or temporary clock buffer signal 162. This skew detect circuitry will continue to output adjustment bits, but now they will toggle from one clock cycle to the next because the two signals 161 and 162 are essentially synchronized to the circuitry limits. The skew is no more than 30 picoseconds and may be less than 5 picoseconds.

Figure 3:
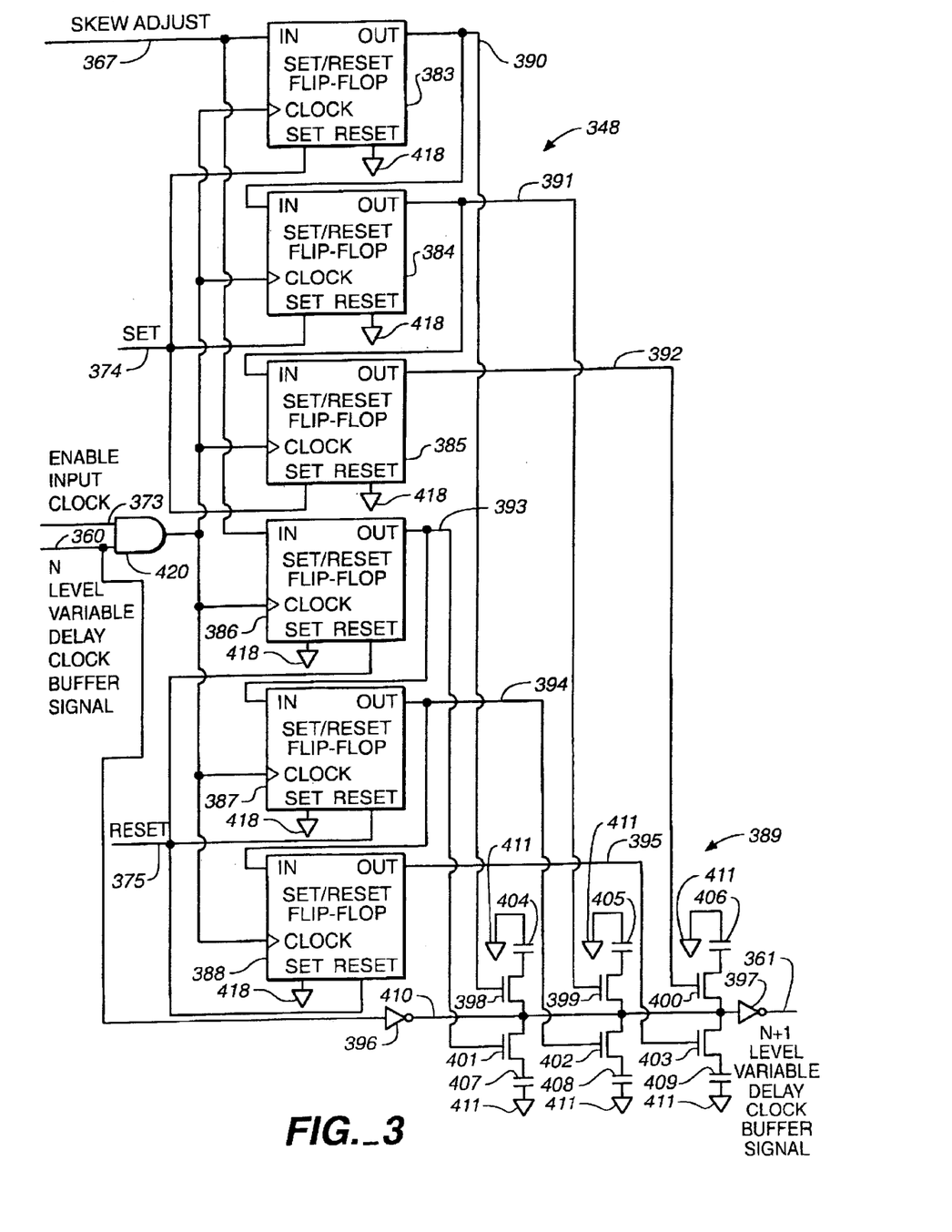
FIG. 3 is another embodiment of the skew adjust circuit of the clock tree deskew circuit.

In FIG. 3, another embodiment of the skew adjust circuit is shown. The buffer structure 389 generally includes inverters 396 and 397, a set of transistor switches 398, 399, 400, 401, 402, and 403 and a set of capacitors 404, 405, 406, 407, 408, and 409. The output of inverter 396 connects to the input of inverter 397 across signal line 410. The input of inverter 396 inverts the input clock signal 360 and sends it across signal line 410 to the inverter 397, which inverts the clock signal again and produces it as output clock signal 361.

The transistor switches 398, 399, 400, 401, 402 and 403 connect between signal line 410 and the capacitors 404, 405, 406, 407, 408 and 409, respectively, which in turn connect to ground 411. When any one of the transistor switches 398, 399, 400, 401, 402, or 403 is closed, its respective capacitor 404, 405, 406, 407, 408, or 409 applies a capacitive load to the inverted signal on signal line 410, due to the time required to charge and discharge the capacitors 404, 405, 406, 407, 408 and 409.

When few or none of the transistor switches 398 to 303 are closed, then the capacitive load, and thus the delay, applied to the inverted signal is small or minimized. When most or all of the transistor switches 398 to 403 are closed, then the capacitive load, and thus the delay, applied to the inverted signal is large or maximized. By selectively closing or opening the transistor switches 398 to 403, the delay in the inverted signal is increased or decreased in predetermined increments, or steps, as determined by the capacitance of the capacitors 404 to 409.

Other operational details of FIG. 3 may be found in the description of FIG. 3 of U.S. Pat. No. 6,340,905, which is herein incorporated by reference.

The number of set of set/reset flip-flops in the skew adjust circuit need not be six, but may be a number such as four, eight, ten, or any other odd or even number that provides sufficient calibration of the variable delay clock buffer. Other circuits may be used to adjust the skew.

Figure 6A:
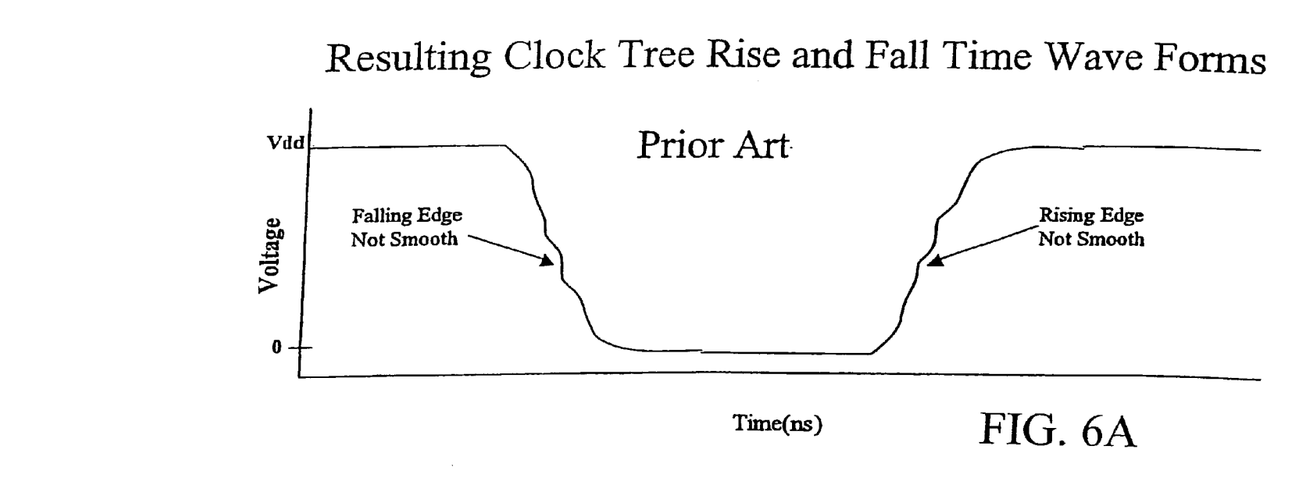
FIG. 6A illustrates a timing diagram of a prior art device.
Figure 6B:
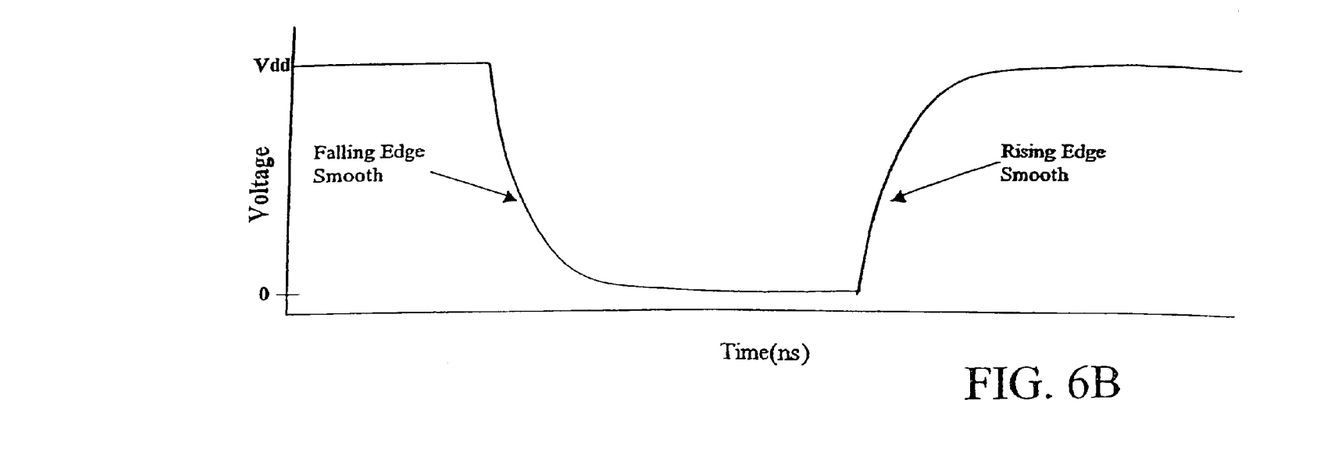
FIG. 6B illustrates a timing diagram of the present invention.

FIG. 6B illustrates a timing diagram of the present invention. The transition of the clock of the present invention is cleaner than the transition of the clock of the prior art (FIG. 6A) since, in the present invention, there is no contention between multiple clock buffers that drive the clock tree since the temporary driver net is turned off after the variable delay clock buffers are deskewed with respect to the temporary driver net. In contrast, in the prior art, the temporary driver net is used to drive the clock tree.

Each level of the clock tree may optionally be set rather than successively set. For instance, a user may set the first and third levels, but not the second. Or, the user may set the second and third levels, but not the first. Or, the user may set the first and fourth level, but not the second and third. Other combinations of setting levels may be performed.

The programmable clock buffers may be controlled by external firmware and/or an internal micro controller. All that is needed is a register to keep track of what adjustments are needed for each programmable buffer. The adjustment information may also be written to an EPROM, flash memory, SRAM, DRAM, or hard drive. The advantage of this method is that all adjustments are self calibrating and do not need external software or hardware.

Figure 7:
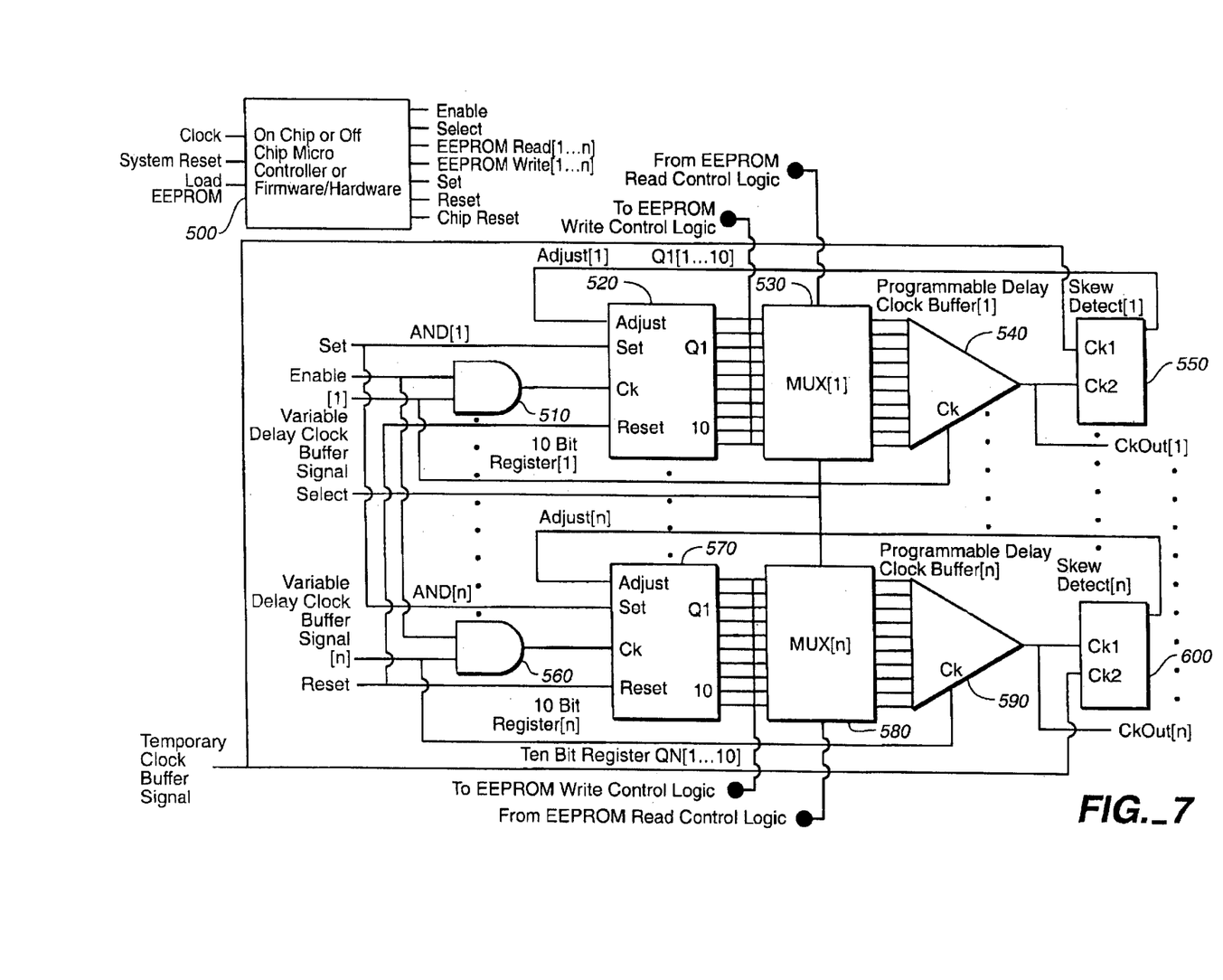
FIG. 7 illustrates an embodiment of the invention using a microcontroller.

FIG. 7 illustrates an embodiment of the present invention using a micro controller and EEPROM wherein the microcontroller and EEPROM may be disposed external to the chip. Components 510, 520, 530, 540, 550, 560, 570, 580, 590, 600 form another embodiment of skew detect and skew adjust circuits for one of the levels of the multilevel clock tree. The microcontroller 500 provides the set, reset, and enable signals for the deskew logic. As shown, the clock may be controlled by the enable signal through a logic gate 510, 560. An enabled clock is used by a 10 bit register for timing the adjustment for the particular variable delay clock buffer. The MUX 530, 580 switches on and off the data from the registers 520, 570 or allows the previous adjustments which were stored in the EEPROM to load or control the programmable delay buffers. A programmable delay clock buffer 540, 590 controls the output of the resulting clock signal. The set and reset signals allow for initialization of the adjustment circuitry. Other variations are within the purview of the invention.

The exemplary embodiment of FIG. 7 also permits testing of the integrated circuit's multilevel clock tree to finely control for process variations during manufacture.

The present invention may be incorporated into a portable device such as a lap top, cell phone, PDA, pager, and the like. An advantage of the present invention is that the user of the device which incorporates the integrated circuit may, as needed or desired, recalibrate the clock tree. This would especially be useful when the portable device experiences temperature and other environmental changes since a user may elect to reset the skew adjustments of the clock tree. This would be especially useful for out of doors applications.

Further, it is believed that the present invention and many of its attendant advantages will be understood by the foregoing description, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for deskewing clock signals generated from a multilevel clock tree to synchronize operation of synchronized clock circuit components in an integrated circuit, comprising:

receiving a first clock signal;

generating a plurality of groups of second clock signals from the first clock signal;

designating one of each group of the plurality of groups of second clock signals as a second clock reference signal;

detecting and adjusting the skew, in each group of the plurality of groups of second clock signals, by comparing the second clock reference signal of that group with each of the other second clock signals of that group; and generating a plurality of groups of third clock signals in which the third clock signals are generated only from those second clock signals of that group which are not second clock reference signals.

2. The method of claim 1, further comprising the steps of designating one of each group of the plurality of groups of third clock signals as a third clock reference signal; and detecting and adjusting the skew of the plurality of groups of third clock signals, by comparing the third clock reference signal of that group with each of the other third clock signals, the means for adjusting generating a plurality of groups of fourth clock signals only from the third clock signals of that group which are not reference signals in a multilevel clock tree structure.

3. The method of claim 2, wherein each level of the multilevel clock tree has its own enable signal which permits the clock tree to be calibrated for that level and that level only.

4. The method of claim 3, wherein each group of a selected level of the multilevel clock tree does not receive any signals from and does not transmit any signals to any other group of that selected level of the multilevel clock tree.

5. An integrated circuit with clock deskewing circuitry, comprising:

means for receiving a first clock signal;

means for generating a plurality of groups of second clock signals from the first clock signal;

means for designating one of each group of the plurality of groups of second clock signals as a second clock reference signal; and means for detecting and adjusting the skew, in each group of the plurality of groups of second clock signals, by comparing the second clock reference signal of that group with each of the other second clock signals, the means for adjusting generating a plurality of groups of third clock signals only from the second clock signals of that group which are not reference signals.

6. The integrated circuit of claim 5, further comprising means for designating one of each group of the plurality of groups of third clock signals as a third clock reference signal; and means for detecting and adjusting the skew of the plurality of groups of third clock signals, by comparing the third clock reference signal of that group with each of the other third clock signals, the means for adjusting generating a plurality of groups of fourth clock signals only from the third clock signals of that group which are not reference signals in a multilevel clock tree structure.

7. The integrated circuit of claim 5, the plurality of groups of third clock signals being used to time the active circuit components of the integrated circuit.

8. The integrated circuit of claim 6, further comprising means for generating a plurality of n th clock signals from (n−1) th, where n is a natural number greater than 4.

9. The integrated circuit of claim 6, further comprising means for ensuring synchronization between all the clock signals of a given level in the multilevel clock tree structure in addition to the means for detecting and adjusting the skew.

10. The integrated circuit of claim 9, wherein the means for ensuring synchronization include means for providing identical clock signal path lengths and symmetric layouts of the clock signal paths for a given level.

11. The integrated circuit of claim 5, wherein each group of the plurality of groups of second clock signals is isolated from other groups of the plurality of second clock signals such that no group of the plurality of groups of second clock signals receives any signal from or transmits any signal to the other groups of the plurality of groups of second clock signals.

12. The integrated circuit of claim 5, wherein the integrated circuit is incorporated into a portable device.

13. The integrated circuit of claim 12, wherein the integrated circuit is incorporated into one of the group consisting of a lap top, a cell phone, a personal device assistant, and a pager.

14. The integrated circuit of claim 5, wherein the means for detecting and adjusting are selectively enabled.

15. An integrated circuit for deskewing clock signals in a multilevel clock tree structure, comprising:

a buffer for receiving a first clock signal and fanning out a plurality of second clock signals derived from the first clock signal, the plurality of second clock signals being divided into distinct groups;

first level skew detect and adjust circuitry, of a first level of the multilevel clock tree, dedicated to each of the distinct groups of the plurality of second clock signals so that each of the distinct groups of the plurality of second clock signals each generates a plurality of third clock signals, wherein in each of the distinct groups of the plurality of second clock signals, one of the second clock signals is a reference clock signal and the others are variable delay clock buffer signals such that the reference clock signal is used to reduce the skew of the variable delay clock buffers, only the variable delay clock buffers from each distinct group of the plurality of second clock signals being used to generate the plurality of clock signals corresponding to each distinct group of the plurality of second clock signals.

16. The integrated circuit of claim 15, wherein each of the plurality of second clock signals travels along a conductive path from the buffer to the first level skew detect and adjust circuitry that is matched with the other conductive paths of the remainder of the plurality of second clock signals in that the signal path lengths are identical and the signal path layout has geometric symmetry.

17. The integrated circuit of claim 16, wherein the geometric symmetry includes an H-shaped layout.

18. The integrated circuit of claim 15, wherein there are n levels of the multilevel clock tree, each level having distinct groups of n th clock signals as input to and (n+1) th clock signals as output from n th level skew detect and adjust circuitry which is uniquely assigned to a distinct group of the n th clock signals and which outputs a distinct group of (n+1) th clock signals, wherein one of each distinct group of n th clock signals is a reference clock signal by which the remainder of that distinct group of n th clock signals is adjusted, wherein n is a natural number greater than or equal to 2.

19. The integrated circuit of claim 18, wherein all the levels of the skew detect and adjust circuitry is physically laid out on the integrated chip in a concentric manner.

20. The integrated circuit of claim 15, wherein the skew adjust circuitry is implemented using tristatable buffers to set an adjustment time for clock signal adjustment.

21. The integrated circuit of claim 15, wherein the skew adjust circuitry is implemented using switched capacitors.

22. The integrated circuit of claim 15, wherein the skew detect and adjust circuitry is implemented using an internal microcontroller and an external memory which stores adjustment data from the integrated circuit and loads adjustment data to the integrated circuit.

23. The integrated circuit of claim 15, wherein the skew detect and adjust circuitry is implemented using an external microcontroller and an external memory which stores adjustment data from the integrated circuit and loads adjustment data to the integrated circuit.

24. The integrated circuit of claim 23, wherein the external memory is an electrically erasable programmable read only memory.

25. The integrated circuit of claim 18, wherein each level of the multilevel clock tree is independently settable through its own enable signal.

26. The integrated circuit of claim 25, wherein each level is automatically set.

* * * * *